(12) United States Patent
Murata et al.

(10) Patent No.: US 6,340,125 B1
(45) Date of Patent: Jan. 22, 2002

(54) APPARATUS FOR BREAKING CHIPS AND SYSTEM FOR TREATING CHIPS

(75) Inventors: Shintaro Murata, Nagoya; Tatsuyuki Honda, Nishio; Toshihiro Kondo; Teruki Kamimura, both of Okazaki, all of (JP)

(73) Assignees: Fuji Machine Mfg. Co., Ltd.; Techno21Group Corporation, both of Aichi-ken (JP)

( * ) Notice: Subject to any disclaimer, the term of this patent is extended or adjusted under 35 U.S.C. 154(b) by 0 days.

(21) Appl. No.: 09/359,738

(22) Filed: Jul. 23, 1999

(30) Foreign Application Priority Data

Sep. 3, 1998 (JP) .......................... 10-249903

(51) Int. Cl.[7] .......................... B02B 1/00; B02C 11/08; B07B 11/00
(52) U.S. Cl. .................. 241/47; 241/278.1; 241/282.1; 241/292.1; 241/300.1
(58) Field of Search .............................. 241/277, 278.1, 241/282.1, 282.2, 86.1, 92, 47, 60, 260.1, 36, 257.1, 258, 292.1, 300.1

(56) References Cited

U.S. PATENT DOCUMENTS

| | | | | |
|---|---|---|---|---|
| 3,410,495 A | * | 11/1968 | Eklund .................... | 241/278.1 |
| 4,852,814 A | * | 8/1989 | Amiot et al. ............... | 241/86.1 |
| 4,985,976 A | * | 1/1991 | Titmas et al. ............... | 241/277 |
| 4,988,045 A | * | 1/1991 | Griesedieck, III et al. .... | 241/36 |
| 5,692,548 A | * | 12/1997 | Bouwers et al. ............ | 241/277 |
| 5,785,261 A | * | 7/1998 | Lanner ........................ | 241/36 |

FOREIGN PATENT DOCUMENTS

JP        Y2-3-41795        9/1991

* cited by examiner

Primary Examiner—Ed Tolan
(74) Attorney, Agent, or Firm—Oliff & Berridge

(57) ABSTRACT

An apparatus for breaking chips into fragments, including an outer structure which is fixedly provided such that a center line of the outer structure is parallel to a reference direction having a vertical component, an inner structure which is provided inside the outer structure such that the inner structure is concentric with the outer structure, a rotary drive device which rotates, in a rotating direction, the inner structure about the center line, and the inner structure including a central portion which is concentric with the outer structure, and a plurality of blades which extend radially outwardly from an outer circumferential surface of the central portion and each of which is inclined relative to the rotating direction such that a lower surface of the each blade can be seen as viewed from a downstream side of the each blade in the rotating direction.

23 Claims, 9 Drawing Sheets

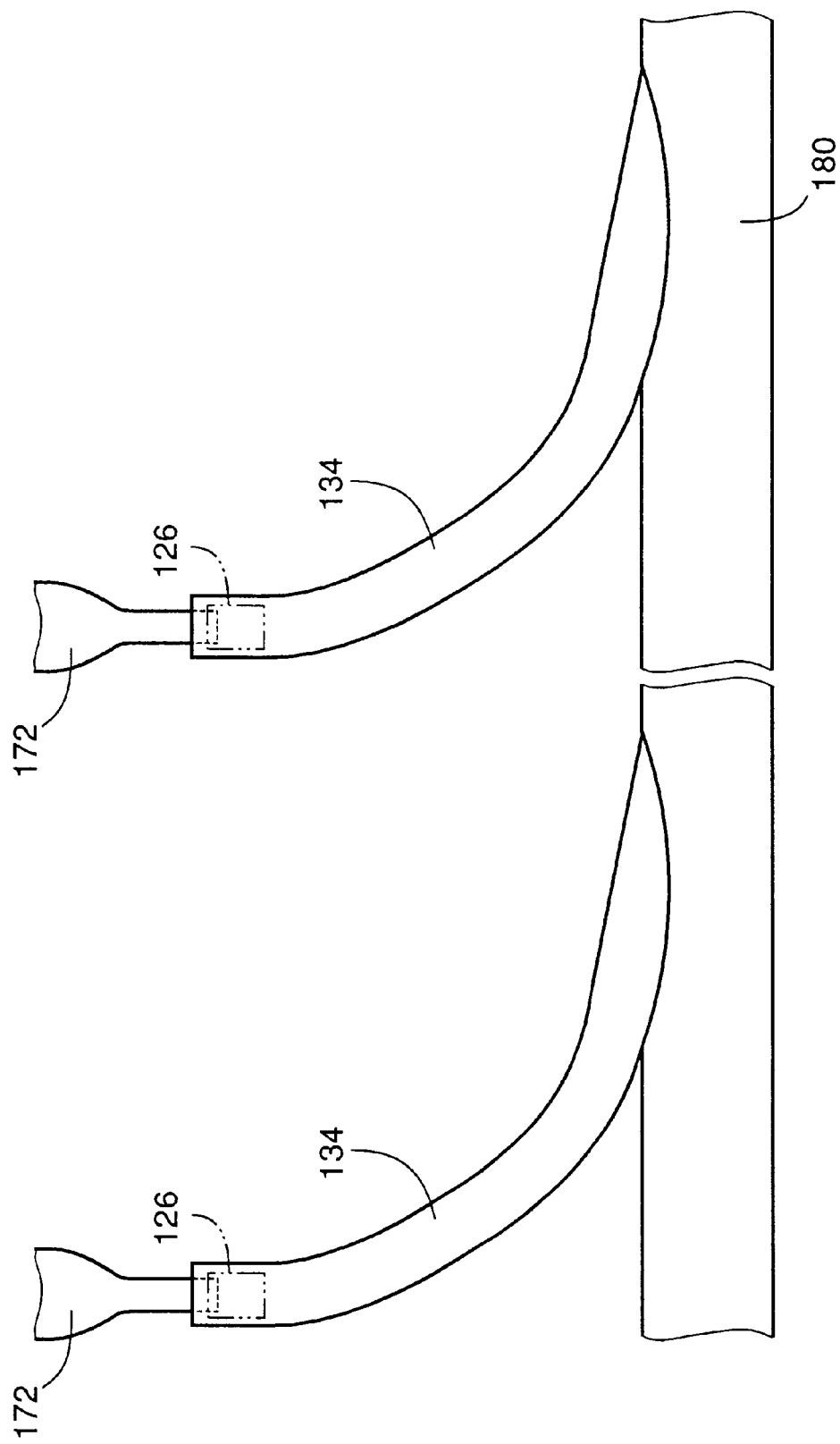

APPARATUS FOR BREAKING CHIPS AND SYSTEM FOR TREATING CHIPS

BACKGROUND OF THE INVENTION

1. Field of the Invention

The present invention relates to an apparatus for breaking chips produced by cutting metallic workpieces, into small fragments, and a system for treating the chips.

2. Related Art Statement

When a machine tool such as a lathe, a drilling machine, a milling machine, or a planing machine cuts metallic workpieces or blanks, a large amount of chips are produced. In many cases, those chips are so sharp and are very difficult to treat. Elongate noodle-like chips are particularly difficult to treat. Hence, there have been known two sorts of apparatuses each for breaking chips into small fragments that are easy to treat. One known apparatus includes two rotary cutters which are rotated in opposite directions, respectively, to shear chips and thereby break the same into fragments. The other known apparatus includes a fixed cutter and a rotary cutter which is rotated relative to the fixed cutter to shear chips.

However, the above-indicated two known apparatuses have the problem that it is difficult for the two cutters to bite noodle-like chips which are entangled with one another or break those chips into fragments. In addition, since the known apparatuses break chips primarily by shearing, the broken chips or the fragments are so sharp and are very difficult to treat. For example, the sharp fragments may hurt the hands of workers, or may engage one another so strongly that they are difficult to separate. Meanwhile, it has been practiced that broken chips or fragments are conveyed by utilizing an air flow. In this case, sharp fragments hurt or damage the inner surface of a tube member that forms a chip-convey passage, thereby lowering the life expectancy of the tube member. In a particular case where the tube member is provided by a hose formed of an organic material, for the purpose of giving some flexibility to the chip-convey passage, sharp fragments largely lower the life expectancy of the hose.

The present invention has been developed in the above-described background.

SUMMARY OF THE INVENTION

The present invention provides a chip breaking apparatus and a chip treating system which have one or more of the technical features that are described below in respective paragraphs given parenthesized sequential numbers (1) to (35). Any technical feature which includes another technical feature shall do so by referring, at the beginning, to the parenthesized sequential number given to that technical feature. Thus, two or more of the following technical features may be combined, if appropriate. Each technical feature may be accompanied by a supplemental explanation, as needed. However, the following technical features and the appropriate combinations thereof are just examples to which the scope and spirit of the present invention are by no means limited.

(1) According to a first feature of the present invention, there is provided an apparatus for breaking chips into fragments, comprising an outer structure which is fixedly provided such that a center line of the outer structure is parallel to a reference direction having a vertical component; an inner structure which is provided inside the outer structure such that the inner structure is concentric with the outer structure; a rotary drive device which rotates, in a rotating direction, the inner structure about the center line; and the inner structure including a central portion which is concentric with the outer structure, and a plurality of blades which extend radially outwardly from an outer circumferential surface of the central portion and each of which is inclined relative to the rotating direction such that a lower surface of the each blade can be seen as viewed from a downstream side of the each blade in the rotating direction. When the inner structure is rotated, respective leading edges of the blades (i.e., respective downstream-side ends of the blades in the rotating direction) strike and break respective portions of elongate noodle-like chips entangled with one another, or engage and draw the same, thereby separating the same from the respective remaining portions of the chips into considerably small fragments. In addition, since each of the blades is inclined relative to the rotating direction such that the lower surface of the each blade can be seen as viewed from the downstream side of the each blade in the rotating direction, the each blade being rotated functions to draw the chips downward. Moreover, an air flow generated by the rotation of the blades contributes to drawing the chips downward and separating the same from one another. In the case where the chip breaking apparatus in accordance with the first feature (1) is provided on an upstream side of a chip breaking apparatus in accordance with the tenth feature (10) described later, the former chip breaking apparatus supplies, to the latter or downstream-side chip breaking apparatus, elongate noodle-like chips entangled with one another, while separating or breaking those chips into considerably small fragments.

(2) According to a second feature of the present invention, there is provided an apparatus for breaking chips into fragments, comprising an outer structure which is fixedly provided such that a center line of the outer structure is parallel to a first direction having a vertical component; an inner structure which is provided inside the outer structure such that the inner structure is concentric with the outer structure; a rotary drive device which rotates the inner structure about the center line; and the inner structure including a central portion which is concentric with the outer structure, a plurality of blades which extend radially outwardly from an outer circumferential surface of the central portion, and a plurality of separating portions which extend from the plurality of blades, respectively, in a second direction having a vertically upward component. In the case where the outer and inner structures are provided such that the common center line thereof is vertical, the separating portions extend upward from the respective upper surfaces of the blades, and are rotated about the common center line as the blades are rotated. When noodle-like chips entangled with one another are cast downward onto the separating portions, the separating portions engage respective portions of the chips and draw the same around, thereby separating the same from the remaining portions of the chips. Simultaneously, respective leading edges of the blades engage respective portions of the noodle-like chips entangled with one another, and draw the same around, thereby separating the same from the remaining portions of the chips. The shape of each of the blades of the chip breaking apparatus in accordance with the second feature (2) is not limited to that of each of the blades of the chip breaking apparatus in accordance with the first feature (1). However, it is desirable that the blades of the apparatus in accordance with the second feature (2) have the same shape as that of the blades of the apparatus in accordance with the first feature (1). In the latter case, the chip breaking apparatus in accordance with the second feature (2) enjoys the same advantages of the chip breaking apparatus in accordance with the first feature (1). The above description relates to the case where the common center line of the outer and inner structures is vertical. Even if the common center line of the outer and inner structures may be inclined relative to the vertical direction, the chip breaking apparatus can enjoy similar advantages, so long as the separating portions extend from the blades in a direction having a vertically upward component and the chips are cast downward onto the separating portions. Basically, the separating portions extend from the blades in a direction parallel to the center line of the inner structure. However, the separating portions may extend in a direction inclined relative to the center line of the inner structure.

(3) According to a third feature of the present invention that includes the second feature (2), each of the separating portions comprises a plate-like portion. The plate-like portion may be flat or curved so long as it has a substantially uniform thickness. It is desirable that the plate-like separating portions be inclined relative to the rotating direction, because those separating portions can easily engage or catch noodle-like chips irrespective of where in a radial direction those chips are cast in the present apparatus. However, a single plate-like portion may be replaced with one or more bar-like portions. In the case where each separating portion is provided by a plurality of bar-like portions, it is desirable that the bar-like portions be located at different positions in the radial direction of the outer structure.

(4) According to a fourth feature of the present invention that includes the second or third feature (2) or (3), the second direction is substantially parallel to the first direction. In this case, the separating portions can be easily formed.

(5) According to a fifth feature of the present invention, there is provided an apparatus for breaking chips into fragments, comprising an outer structure; an inner structure which is provided inside the outer structure such that the inner structure is concentric with the outer structure; a rotary drive device which rotates, in a rotating direction, at least one of the inner and outer structures relative to the other of the inner and outer structures, about a common center line of the inner and outer structures; the outer structure including a cylindrical portion, and an outer spiral blade portion which spirally projects from an inner circumferential surface of the cylindrical portion; and the inner structure including a central portion which is concentric with the cylindrical portion of the outer structure, and an inner spiral blade portion which extends radially from an outer circumferential surface of the central portion to a position in vicinity of the outer spiral blade portion, and which is inclined relative to the rotating direction such that at least one of a direction in, and an angle by, which the inner spiral blade portion is inclined differs from a corresponding one of a direction in, and an angle by, which the outer spiral blade portion is inclined, the inner spiral blade portion cooperating with the outer spiral blade portion to break the chips into the fragments. In the present apparatus, the outer and inner spiral blade portions can easily bite noodle-like chips entangled with one another and break the same into considerably small fragments. When the outer and inner structures are rotated relative to each other, the outer and inner spiral blade portions are moved relative to each other, while breaking the chips in a gap defined therebetween. The chips may be broken by a shearing or a tearing action of the two spiral blade portions. In the case where the chips are broken by the tearing action of the two spiral blade portions, the gap defined between the two (i.e., outer and inner) spiral blade portions may have a width which is, e.g., not smaller than 0.5 mm, not smaller than 1.0 mm, not smaller than 2.0 mm, or not smaller than 3.0 mm. That the respective directions of inclination of the outer and inner spiral blade portions with respect to the rotating direction differs from each other means, for example, that in the case where the outer blade portion runs in a downward direction as it runs in the rotating direction, the inner blade portion runs in an upward direction as it runs in the same direction, and vice versa, or that in the case where the outer blade portion runs in a rightward direction as it runs in the rotating direction, the inner blade portion runs in a leftward direction as it runs in the same direction, and vice versa. The angle of inclination of the outer or inner spiral blade portion with respect to the rotating direction takes an acute angle as measured in one of opposite directions, and takes an obtuse angle as measured in the other direction, or vice versa. As far as the present application is concerned, the angle of inclination of the outer or inner blade portion is defined as taking an acute angle. Therefore, even in the case where the two blade portions are inclined in the same direction with respect to the rotating direction, the respective inclination angles of the two blade portions with respect to the rotating direction may differ from each other; and even in the case where the respective inclination angles of the two blade portions with respect to the rotating direction are equal to each other, the two blade portions may be inclined in different directions, respectively, with respect to the rotating direction. Since the direction and/or angle of inclination of the inner blade portion differ or differs from the direction and/or angle of inclination of the outer blade portion, the two blade portions do not break all at once the chips over a wide range corresponding to the shorter one of the respective lengths of the two blade portions, unlike in the case where the direction and angle of inclination of the inner blade portion are the same as those of the outer blade portion. Therefore, the rotary drive device can be of a small size that exhibits a considerably low performance. In addition, respective maximums of the noise and vibration produced when the chips are broken can be reduced. In the case where the outer and inner structures are provided such that a common center line thereof is parallel to a direction having a vertical component, in particular, is vertical, the gravity exerted to the chips helps the two blade portions effectively bite the chips. However, it is not essentially required that the common center line of the outer and inner structures be parallel to a direction having a vertical component. In the latter case, it is possible to employ, e.g., a chip moving device which moves the chips in a direction having a component parallel to the center line of the outer and inner structures. Two or all of the first, second, and fifth features (1), (2), and (5) may be arbitrarily combined with each other or one another.

(6) According to a sixth feature of the present invention that includes the fifth feature (5), at least one of the outer spiral blade portion and the inner spiral blade portion comprises a plurality of separate portions which are separate from each other in the rotating direction. In this case, the plurality of spiral separate portions define a plurality of spaces therebetween about the common center line of the outer and inner structures. Accordingly, noodle-like chips entangled with one another can easily enter those spaces, and the two spiral blade portions can easily bite those chips.

(7) According to a seventh feature of the present invention that includes the sixth feature (6), the plurality of separate portions are located at a same position in a reference direction parallel to the common center line. In this case, the angle of inclination of each of the separate spiral blades with respect to the rotating direction can be increased while the overall length of the present apparatus in the reference direction can be decreased and the chances of breaking of the chips can be increased. However, the separate spiral blades may be arranged along a single spiral curved line. If the inner spiral blade portion of the present apparatus in accordance with the seventh feature (7) comprises a plurality of separate portions and if the apparatus in accordance with each of the first to fourth features (1) to (4) additionally comprises an outer spiral blade portion, the latter apparatus is readable on the former apparatus, because the plurality of blades of the latter apparatus are readable on the plurality of separate portions as the inner spiral blade portion of the former apparatus. If the plurality of inner separate spiral blades are employed in combination with the outer spiral blade portion and if the outer spiral blade portion is inclined such that the outer blade portion runs downward as it runs in the rotating direction, the outer blade portion functions as a guide member which guides, in a downward direction owing to the effect of inclination of the guide member, the chips which are rotated with the inner separate blades and are forcedly engaged with the guide member by centrifugal forces.

(8) According to an eighth feature of the present invention that includes any one of the fifth to seventh features (5) to (7), the rotary drive device comprises an inner-structure rotating device which rotates the inner structure relative to the outer structure. In this case, the chips are rotated with the inner spiral blade portion and are forcedly engaged with the outer spiral blade portion by centrifugal forces. Thus, the two blade portions can easily bite the chips. However, the outer structure may be rotated relative to the inner structure. In the latter case, it is needed to provide a fixed housing outside the outer structure, for avoiding safety hazards. Since the apparatus in accordance with the eighth feature (8) need not employ the fixed housing outside the outer structure, the apparatus enjoys a simple construction.

(9) According to a ninth feature of the present invention that includes any one of the first to eighth features (1) to (8), the common center line is substantially vertical. In this case, the gravity exerted to the chips most effectively helps the outer and inner spiral blade portions bite the chips.

(10) According to a tenth feature of the present invention, there is provided an apparatus for breaking chips into fragments, comprising an outer structure; an inner structure which is provided inside the outer structure such that the inner structure is concentric with the outer structure; a rotary drive device which rotates, in a rotating direction, at least one of the inner and outer structures relative to the other of the inner and outer structures, about a common center line of the inner and outer structures; the outer structure including a cylindrical portion, and an outer breaking portion which projects from an inner circumferential surface of the cylindrical portion; and the inner structure including an inner breaking portion which cooperates with the outer breaking portion to define a gap therebetween whose width cannot cause the chips to be sheared by the inner and outer breaking portions. In the case where the width of the gap is very small, the inner and outer breaking portions can break, by shearing, the chips in the gap. On the other hand, in the case where the gap is considerably wide, the two breaking portions cannot break the chips by shearing. In the latter case, the two breaking portions break the chips by tearing and/or striking. The width of the gap that cannot cause the chips to be sheared by the two breaking portions may be not smaller than 0.5 mm, not smaller than 1.0 mm, not smaller than 2.0 mm, or not smaller than 3.0 mm. In the case where the chips are broken into fragments without being sheared, those fragments are free of sharp burrs which would be produced when the chips are broken by shearing. In addition, since the chips are more likely bitten into the wide gap between the inner and outer breaking portions, the chips are more likely ground by the two breaking portions. Thus, an amount of fragments with sharp burrs is decreased. Fragments free of sharp burrs do not hurt the workers and, since those fragments do not bite one another so strongly, they are easy to treat. In the case where those fragments are conveyed through a conveying passage by utilizing an air flow, they do not damage the inner surface of the conveying passage. Thus, the life expectancy of the conveying passage is increased.

(11) According to an eleventh feature of the present invention that includes the tenth feature (10), at least one of the outer breaking portion and the inner breaking portion is provided along a line which is inclined relative to a reference direction parallel to the common center line. In this case, as the outer and inner structures are rotated relative to each other, the breaking of the chips occurs at a plurality of relative rotation positions between the two structures. Therefore, the rotary drive device may be of a smaller size that exhibits a lower performance, as compared with the case where the breaking occurs all at once at a single relative rotation position of the two structures. In addition, respective maxima of the noise and vibration produced when the chips are broken can be reduced.

(12) According to a twelfth feature of the present invention that includes the tenth or eleventh feature (10) or (11), at least one of the outer breaking portion and the inner breaking portion has a recess, and the other of the outer and inner breaking portions has a projection which is fitted in the recess such that the gap is left between the projection and the recess. Since the inner and outer breaking portions have the recess and the projection, the gap can be so long that the chips can more likely be broken. Thus, the efficiency of breaking of the chips can be increased.

(13) According to a thirteenth feature of the present invention that includes any one of the tenth to twelfth features (10) to (12), at least one of the outer breaking portion and the inner breaking portion comprises a plurality of breaking blocks each one of which is detachably attachable independent of the other breaking block or blocks. In this case, only a worn or damaged breaking block can be replaced with a new (or repaired) breaking block. This costs much lower than the case where the inner or outer breaking block is provided by an integral large breaking block.

(14) According to a fourteenth feature of the present invention that includes the thirteenth feature (13), the plurality of breaking blocks are provided along a line which is inclined relative to a reference direction parallel to the common center line. In this case, the inner and/or outer breaking portions or portion can be easily provided along a line which is inclined relative to the common center line.

(15) According to a fifteenth feature of the present invention that includes the fourteenth feature (14), the outer breaking portion comprises the plurality of breaking blocks, the cylindrical portion of the outer structure has a plurality of through-holes which are formed through a thickness of the cylindrical portion, and the breaking blocks are externally fitted in the through-holes, respectively, and thereby fixed to an outer circumferential surface of the cylindrical portion. In this case, the breaking blocks can be strongly fixed to the outer surface of the cylindrical portion of the outer structure, in the state in which respective attachment portions of the breaking blocks do not project into the inner space of the cylindrical portion. In addition, since the breaking blocks can be easily removed from the cylindrical portion, by the worker who is outside the cylindrical portion, he or she can easily check or repair the breaking blocks or replace one or more blocks with one or more new or repaired blocks.

(16) According to a sixteenth feature of the present invention that includes any one of the tenth to fifteenth features (10) to (15), the other of the outer breaking portion and the inner breaking portion is provided along a line which is parallel to a reference direction parallel to the common center line. Since the other of the outer and inner breaking portions that is provided along a line parallel to the common center line can be easily produced, the production cost can be reduced as compared with the case where both of the two breaking portions are provided along a line which is inclined relative to the common center line.

(17) According to a seventeenth feature of the present invention that includes the sixteenth feature (16), the other of the outer breaking portion and the inner breaking portion comprises an integral breaking block extending in the reference direction. The above-mentioned one of the outer and inner breaking portions that is provided along a line which is inclined relative to the common center line can be provided by an integral breaking block extending along the inclined line. In this case, however, the integral breaking block cannot help having a complicated shape, which leads to increasing the production cost. This problem does not occur to the integral breaking block which is employed as the other of the outer and inner breaking portions that is provided along a line parallel to the common center line.

(18) According to an eighteenth feature of the present invention that includes any one of the tenth to seventeenth features (10) to (17), the inner structure includes a central portion and a plurality of radial arms which extend radially outwardly from the central portion and each of which has a free end portion providing the inner breaking portion. Since the plurality of radial arms provide a plurality of inner breaking portions, respectively, a space which allows the presence and movement of the chips is provided between each pair of adjacent inner breaking portions and between a corresponding pair of adjacent radial arms. Therefore, the efficiency of breaking of chips is increased. In a particular case where the inner breaking portions are detachably attached to the radial arms, respectively, only a worn or damaged inner breaking portion can be replaced with a new or repaired one. This costs lower as compared with the case where the inner breaking portions are integrally formed with the radial arms.

(19) According to a nineteenth feature of the present invention that includes any one of the tenth to eighteenth features (10) to (18), the cylindrical portion of the outer structure has an opening which is formed through a thickness of the cylindrical portion, and the apparatus further comprises a sieve plate which has a number of holes and which covers the opening of the cylindrical portion. The sieve plate allows the passing therethrough of only fragments whose size can pass through the holes of the sieve plate. Fragments whose size cannot pass through the holes of the sieve plate are kept in the space between the inner and outer structures and are further broken. Thus, the fragments which have passed through the sieve plate do not include too large pieces.

(20) According to a twentieth feature of the present invention that includes the nineteenth feature (19), the chip breaking apparatus further comprises a fragment receptacle which is provided outside the sieve plate, which receives the fragments which have passed through the sieve plate, and which collects the received fragments in a lower portion thereof. The fragments collected in the lower portion of the fragment receptacle can be easily treated. For example, the fragments can be easily conveyed by a fragment conveying device which is employed in the apparatus in accordance with the twenty-first feature (21) described below.

(21) According to a twenty-first feature of the present invention that includes the twentieth feature (20), the chip breaking apparatus further comprises a fragment conveying device which conveys, by utilizing an air flow, the fragments collected in the lower portion of the fragment receptacle to outside the apparatus.

(22) According to a twenty-second feature of the present invention that includes the twentieth or twenty-first feature (20) or (21), at least a portion of the fragment receptacle is displaceable between an operative position where the portion of the receptacle externally covers the sieve plate with a space being left therebetween, and a retracted position, away from the operative position, where the portion of the receptacle permits access to the sieve plate. In the state in which the fragment receptacle is held at its retracted position, the worker can access to the sieve plate and/or the fragment receptacle, for example, can observe the plate and/or receptacle with his or her eyes, or touch the same with his or her hand. Thus, the worker can easily check or repair the same.

(23) According to a twenty-third feature of the present invention that includes the twenty-second feature (22), the portion of the fragment receptacle is pivotable between the operative position and the retracted position. In this case, the fragment receptacle can be easily moved with a simple structure.

(24) According to a twenty-fourth feature of the present invention that includes any one of the tenth to twenty-third features (10) to (23), the common center line is substantially vertical.

(25) According to a twenty-fifth feature of the present invention, there is provided an apparatus for breaking chips into fragments, comprising an outer structure; an inner structure which is provided inside the outer structure such that the inner structure is concentric with the outer structure; a rotary drive device which rotates, in a rotating direction, the inner structure about a substantially vertical center line thereof; the outer structure including a cylindrical portion, an outer spiral blade portion which spirally projects from an upper portion of an inner circumferential surface of the cylindrical portion, and an outer breaking portion which projects from a lower portion of the inner surface of the cylindrical portion; the inner structure including a central portion which is concentric with the cylindrical portion of the outer structure, and an inner spiral blade portion which extends radially from an outer circumferential surface of the central portion to a position in vicinity of the outer spiral blade portion, and which is inclined relative to the rotating direction such that at least one of a direction in, and an angle by, which the inner spiral blade portion is inclined differs from a corresponding one of a direction in, and an angle by, which the outer spiral blade portion is inclined, the inner spiral blade portion cooperating with the outer spiral blade portion to break the chips, the inner structure further including an inner breaking portion which projects radially from the central portion below the inner spiral blade portion and which cooperates with the outer breaking portion to define a gap therebetween whose width cannot cause the chips to be sheared by the inner and outer breaking portions; and at least one of the outer breaking portion and the inner breaking portion being provided along a line which is inclined relative to a reference direction parallel to the substantially vertical center line. The present chip breaking apparatus includes the above-described fifth and eleventh features (5), (11), and accordingly enjoys the same advantages as the combined advantages of the features (5), (11). The present apparatus may further include any one of the sixth to ninth features (6) to (9) and the twelfth to twenty-fourth features (12) to (24). In addition, the present invention may be so embodied as to include the fifth and tenth features (5), (10), or include any one of the first to fourth features (1) to (4) and the tenth or eleventh feature (10) or (11).

(26) According to a twenty-sixth feature of the present invention that includes any one of the fifth to twenty-fifth features (5) to (25), the common center line is parallel to a reference direction having a vertical component, and the apparatus further comprises a plurality of air flowing blades which are provided adjacent to a lower end portion of the inner structure such that the plurality of air flowing blades are concentric with the inner structure and which are rotated about the common center line to generate an air flow directed toward the inner structure. In the present chip breaking apparatus, the chips present between the outer and inner structures tend to move downward because of their own weights. However, the chips are moved upward by the air flow generated by the air flowing blades provided adjacent to the lower end portion of the inner structure. In addition, the air flowing blades have the function of repelling up the chips colliding therewith. In this sense, the air flowing blades can be called as chip repelling blades. Since the space between the outer and inner structures includes a portion in which air flows fast, and a portion in which air flows slow, the chips are moved downward by their own weights on one hand, while being moved upward by the air flow on the other hand. During the downward and upward movements, the chips are bitten and broken by the outer and inner breaking portions. The air flowing blades may be ones which are rotated together with the inner structure, or ones which are rotated at a speed different from the speed at which the inner structure is rotated. In the latter case, the air flowing blades may be rotated directly by an exclusive rotary drive device, or indirectly by the rotary drive device of the inner structure via a rotation-speed changing device, such as a step-up or step-down gear, which transmits the rotation of the rotary drive device to the blades at a changed speed different from the original speed of rotation of the drive device. Anyway, the inner structure and the air flowing blades can be rotated at respective appropriate speeds.

(27) According to a twenty-seventh feature of the present invention, there is provided an apparatus for breaking chips into fragments, comprising a first-stage breaking device which breaks a plurality of elongate chips which are entangled in each other, while untangling the entangled elongate chips; and a second-stage breaking device which further breaks the chips broken by the first-stage breaking device, into fragments. The chip breaking apparatus in accordance with the twenty-fifth feature (25) is readable on the present apparatus in accordance with the twenty-seventh feature (27). In addition, the first-stage breaking device may include any one, any two, or all of the first, second, and fifth features (1), (2), (5), and the second-stage breaking device may include the tenth feature (10).

(28) According to a twenty-eighth feature of the present invention that includes the twenty-seventh feature (27), the second-stage breaking device comprises a sieve member having a number of holes, and the second-stage breaking device continues breaking the chips to the fragments having a size which can cause the fragments to pass through the holes of the sieve member.

(29) According to a twenty-ninth feature of the present invention that includes any one of the first to ninth features (1) to (9), the rotary drive device rotates the at least one of the inner and outer structures relative to the other of the inner and outer structures, at a velocity not less than 800 rotations per minute. The present chip breaking apparatus has a construction which can be rotated at a high velocity or speed and accordingly can break chips at a high efficiency. In the case where the rotation velocity is predetermined at not less than 1,000 rotations per minute, not less than 1,200 rotations per minute, or not less than 1,400 rotations per minute, the present apparatus can break chips at a higher efficiency.

(30) According to a thirtieth feature of the present invention that includes any one of the tenth to twenty-eighth features (10) to (28), the rotary drive device rotates the at least one of the inner and outer structures relative to the other of the inner and outer structures, at a velocity not less than 800 rotations per minute.

(31) According to a thirty-first feature of the present invention, there is provided a chip treating system comprising a chip breaking apparatus according to any one of the first to twentieth and twenty-second to thirtieth features (1) to (20) and (22) to (30); and a fragment conveying device which conveys, by utilizing an air flow, the fragments output from the chip breaking apparatus. The present system can easily treat chips. In particular, since the chip breaking apparatus in accordance with any one of the tenth to nineteenth and twenty-fourth to thirtieth features (10) to (19) and (24) to (30) is suitable for breaking chips into small fragments with less sharp burrs, and the chip breaking apparatus in accordance with any one of the twentieth, twenty-second, and twenty-third features (20), (22) and (23) is suitable for collecting small fragments at a single place, those chip breaking apparatuses are suitable for use with the fragment conveying device which utilizes an air flow for conveying the fragments.

(32) According to a thirty-second feature of the present invention that includes the thirty-first feature (31), the chip breaking apparatus has an outlet through which the fragments are discharged, and the fragment conveying device has a fragment conveying passage whose one end is connected to the outlet, and an air-flow generating device which generates, in the fragment conveying passage, an air flow in a direction away from the outlet.

(33) According to a thirty-third feature of the present invention that includes the thirty-second feature (32), the air-flow generating device comprises an air suction device which generates the air flow by sucking air in a downstream-side portion of the fragment conveying passage that is distant from the outlet of the chip breaking apparatus. It is desirable that the present chip treating system further include, on an upstream side of the air suction device, a fragment separating device which separates the fragments from the air, and/or a filter device which removes foreign matters from the air.

(34) According to a thirty-fourth feature of the present invention that includes the thirty-second or thirty-third feature (32) or (33), the air-flow generating device comprises a pressurized-air-utilizing air-flow generating device which includes an air blowing nozzle which is provided at the one end portion of the fragment conveying passage that is connected to the outlet of the chip breaking apparatus, such that an axial direction of the nozzle is parallel to a lengthwise direction of the passage; and a pressurized-air supplying device which supplies a pressurized air to the air blowing nozzle, so that the pressurized air is blown from the nozzle into the passage, an air pressure around the nozzle is lowered, and accordingly the air flow is generated in a direction from the outlet toward the passage, and in the direction away from the outlet in the passage.

(35) According to a thirty-fifth feature of the present invention that includes any one of the thirty-first to thirty-fourth features (31) to (34), the chip treating system comprises a plurality of chip breaking apparatuses each according to any one of the first to twentieth and twenty-second to thirtieth features (1) to (20) and (22) to (30), and the fragment conveying device comprises a fragment conveying and collecting device which conveys, by utilizing the air flow, the fragments output from the plurality of chip breaking apparatuses and collects the fragments at a common place. For example, the present chip treating system may be employed in a factory in which a plurality of machine tools are used. Each of the chip breaking apparatuses of the present system breaks the chips produced from a corresponding one of the machine tools, or two or more corresponding machine tools that are adjacent to each other, and the fragment conveying and collecting device collects, at a single place, the fragments output from all the chip breaking apparatuses. Thus, the present system can easily treat the chips produced from the factory.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 11 is a plan view of a fragment conveying and collecting device as an element of a chip treating system as a third embodiment of the present invention.

DETAILED DESCRIPTION OF THE PREFERRED EMBODIMENTS

Hereinafter, there will be described a chip breaking apparatus to which the present invention is applied, by reference to FIGS. 1 to 9.

Figure 1:
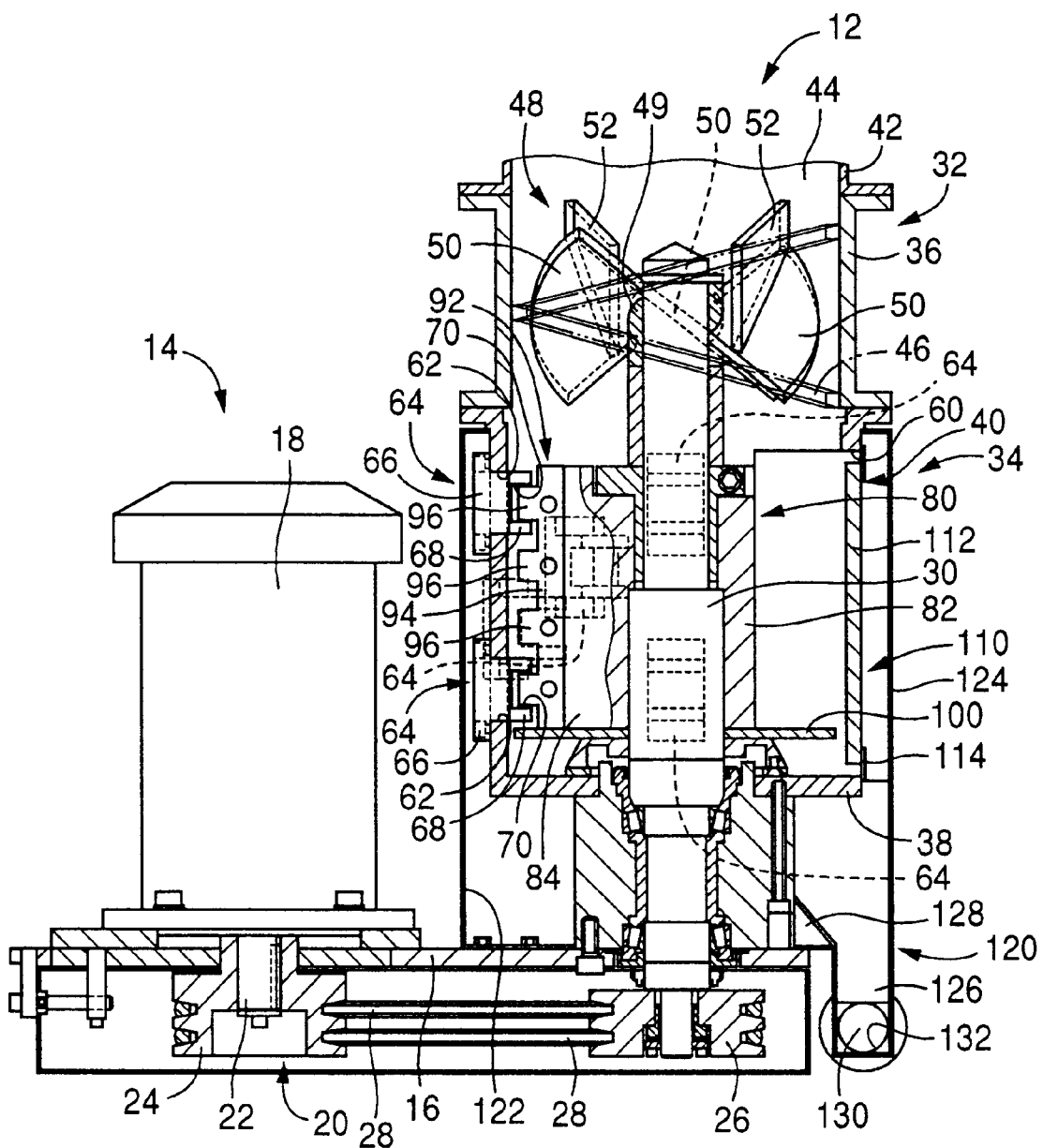
FIG. 1 is a partly cross-sectioned, front elevation view of a chip breaking apparatus to which the present invention is applied.
Figure 2:
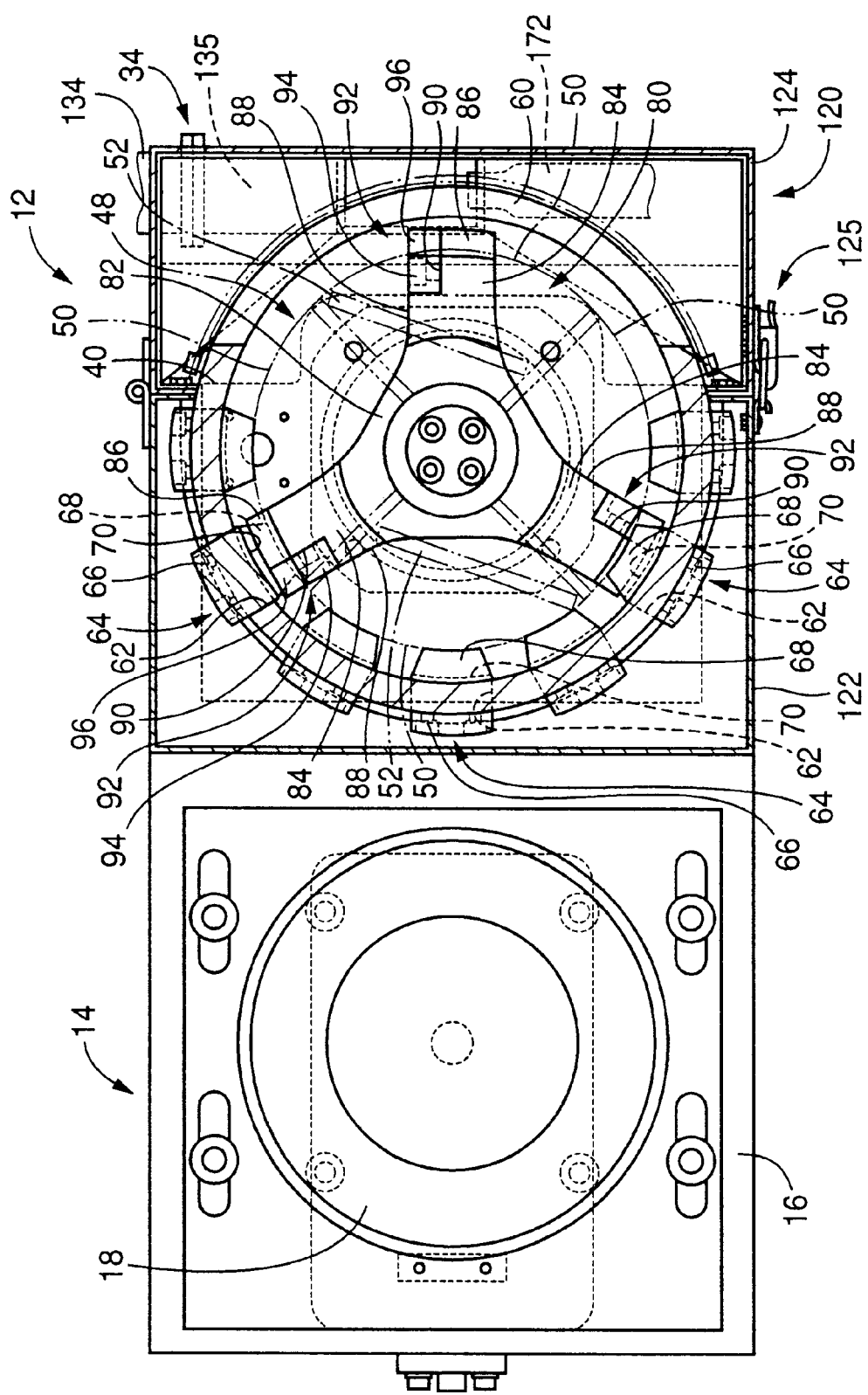
FIG. 2 is a partly cross-sectioned plan view of the chip breaking apparatus of FIG. 1.
Figure 3:
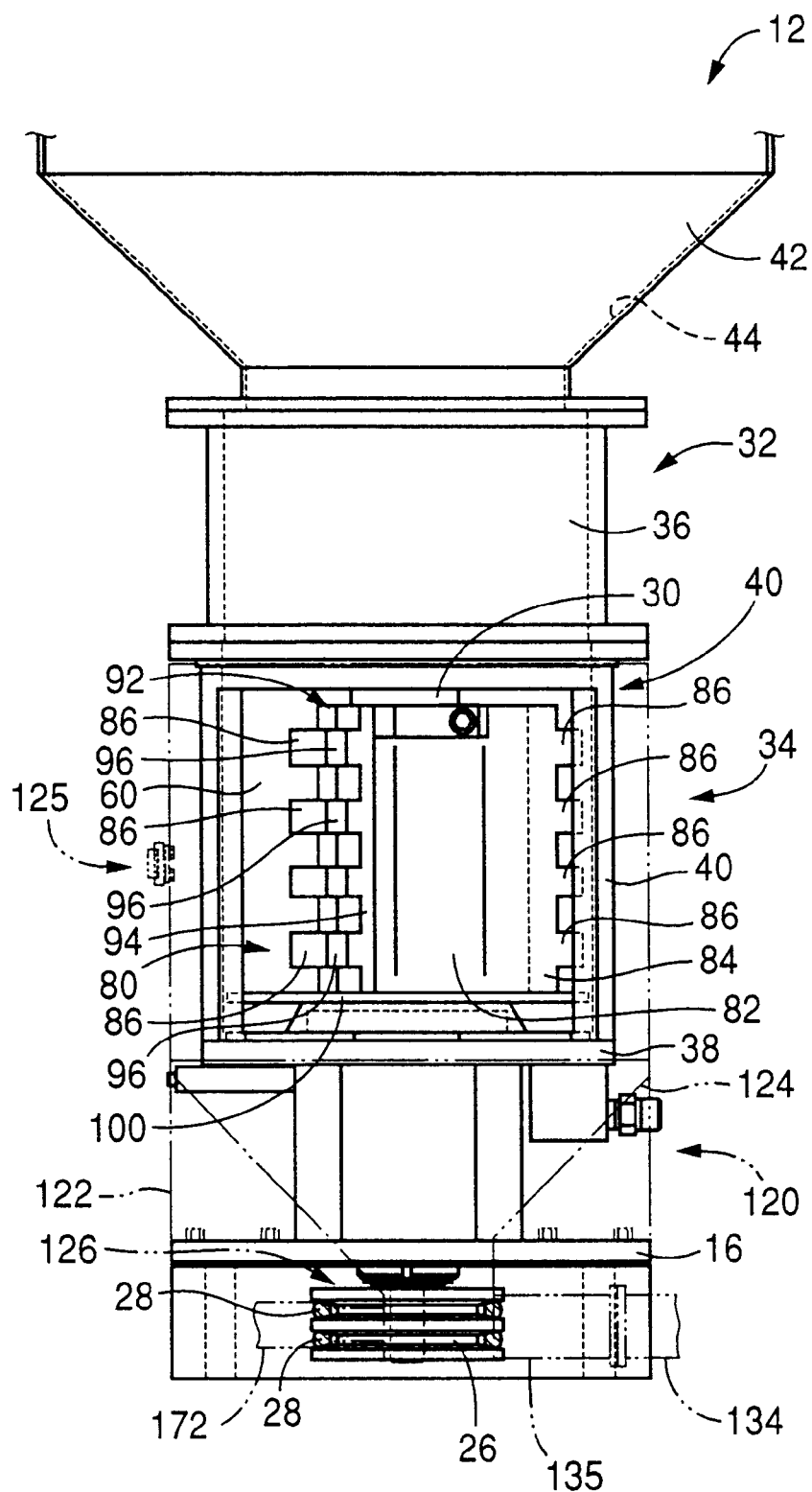
FIG. 3 is a right-hand side elevation view showing the chip breaking apparatus of FIG. 1 in a state in which a fragment receptacle is removed.

As shown in FIGS. 1 to 3, the present chip breaking apparatus includes a chip breaking device 12 and a rotary drive device 14. The chip breaking device 12 and an electric motor 18 as a drive source of the rotary drive device 14 are provided on a base member 16 such that respective center lines of the breaking device 12 and the electric motor 18 are vertical and parallel to each other. The rotary drive device 14 includes, in addition to the electric motor 18, a rotation transmitting device 20 which transmits the rotation of the motor 18 to the chip breaking device 12. The rotation transmitting device 20 includes a pulley 24 fixed to an output shaft 22 of the electric motor 18, a pulley 26 fixed to a vertical rotary drive shaft 30 of the breaking device 12, and two belts 28 which are wound on the two pulleys 24, 26. Thus, as the electric motor 18 is rotated about an axis line of the output shaft 22, i.e., the 20 center line of the motor 18, the rotary shaft 30 is rotated about its vertical axis line, i.e., the center line of the breaking device 12.

The chip breaking device 12 includes a first-stage breaking device 32 and a second-stage breaking device 34 which are vertically adjacent to each other along the axis line of the rotary shaft 30. The first-stage breaking device 32 includes a cylindrical hollow housing 36, and the second-stage breaking device 34 includes a cylindrical housing 40 having a bottom wall 38. The two housings 36, 40 are concentric with each other with respect to the axis line of the rotary shaft 30, and are in communication with each other. Thus, the two housings 36, 40 cooperate with each other to provide a cylindrical housing having a bottom wall, for the chip breaking device 12. The rotary shaft 30 vertically extends through the center of the bottom wall 38 of the housing 40, such that the axis line of the rotary shaft 30 coincides with respective center lines of the two housings 36, 40. Hereinafter, a direction in which the axis line of the rotary shaft 30 extends will be referred to as the "axial direction" of the chip breaking device 12, and radial directions with respect to the axis line of the rotary shaft 30 will be referred to as the "radial directions" of the same 12.

A chip casting hopper 42 is fixed to an upper end of the housing 36, such that an outlet 44 of the hopper 42 is in communication with an upper opening of the first-stage breaking device 32. Thus, chips produced by cutting metallic workpieces or blanks are cast through the outlet 44 into the first-stage breaking device 32.

An outer spiral blade 46 spirally projects from an inner circumferential surface of the housing 36. The outer spiral blade 46 has a rectangular cross section, and spirally extends from a top portion of the housing 36 to a bottom portion of the same 36 along the inner circumferential surface of the same 36. The outer spiral blade 46 is inclined in a downward direction with respect to a rotating direction in which the rotary shaft 30 is rotated by the rotary drive device 14, that is, is inclined such that the spiral blade 46 runs in the downward direction as the same 46 runs in the rotating direction. An involving and breaking member 48 is fixed to an upper end portion of the rotary shaft 30 that corresponds to the first-stage breaking device 32, such that the involving and breaking ("involve-break") member 48 is concentric with the outer spiral blade 46. The involve-break member 48 includes a hub portion 49 which is fitted on the rotary shaft 30 such that the hub portion 49 is not rotatable relative to the same 30 and is not movable relative to the same 30 in the axial direction of the chip breaking device 12. The involve-break member 48 further includes four inner separate blades 50 (three blades 50 are shown in FIG. 1) which extend radially outwardly from the hub portion 49 such that the four blades 50 are equiangularly distant from one another in the rotating direction of the rotary shaft 30. The four inner blades 50 are located at a same position in the axial direction of the chip breaking device 12, and are inclined in an upward direction with respect to the rotating direction of the rotary shaft 30, that is, is inclined such that each of the inner blades 50 runs in the upward direction as the same 50 runs in the rotating direction. Each inner blade 50 is inclined with respect to the rotating direction, by a positive angle different from a positive angle by which the outer spiral blade 46 is inclined with respect to the rotating direction. In the present embodiment, the angle of inclination of each inner blade 50 is greater than that of the outer spiral blade 46. Each inner blade 50 extends radially outwardly from the hub portion 49 to a position in the vicinity of the outer spiral blade 46, such that a gap which cannot cause chips to be sheared by the inner and outer blades 50, 46 is left between a radially outer end surface of the each inner blade 50 and the outer spiral blade 46. In the present embodiment, the gap left between the outer spiral blade 46 and each of the inner blades 50 has the width of 5.0 mm. Two flat-plate-like separating portions 52 project from respective upper surfaces of two inner blades 50 of the four inner blades 50 that are diametrically opposite to each other, such that the two separating portions 52 extend parallel to the axial direction of the chip breaking device 12 and such that a lengthwise direction of each of the two separating portions 52 is inclined relative to the rotating direction of the rotary shaft 30 or the inner blades 50. Therefore, when the involve-break member 48 is rotated with the rotary shaft 30, a radially outer end of each of the two separating portions 52 leads the remaining portion of the each separating portion 52. The respective leading ends of the two separating portions 52 are located on a common cylindrical surface on which the respective radially outer end surfaces of the four inner blades 50 are located.

Figure 6:
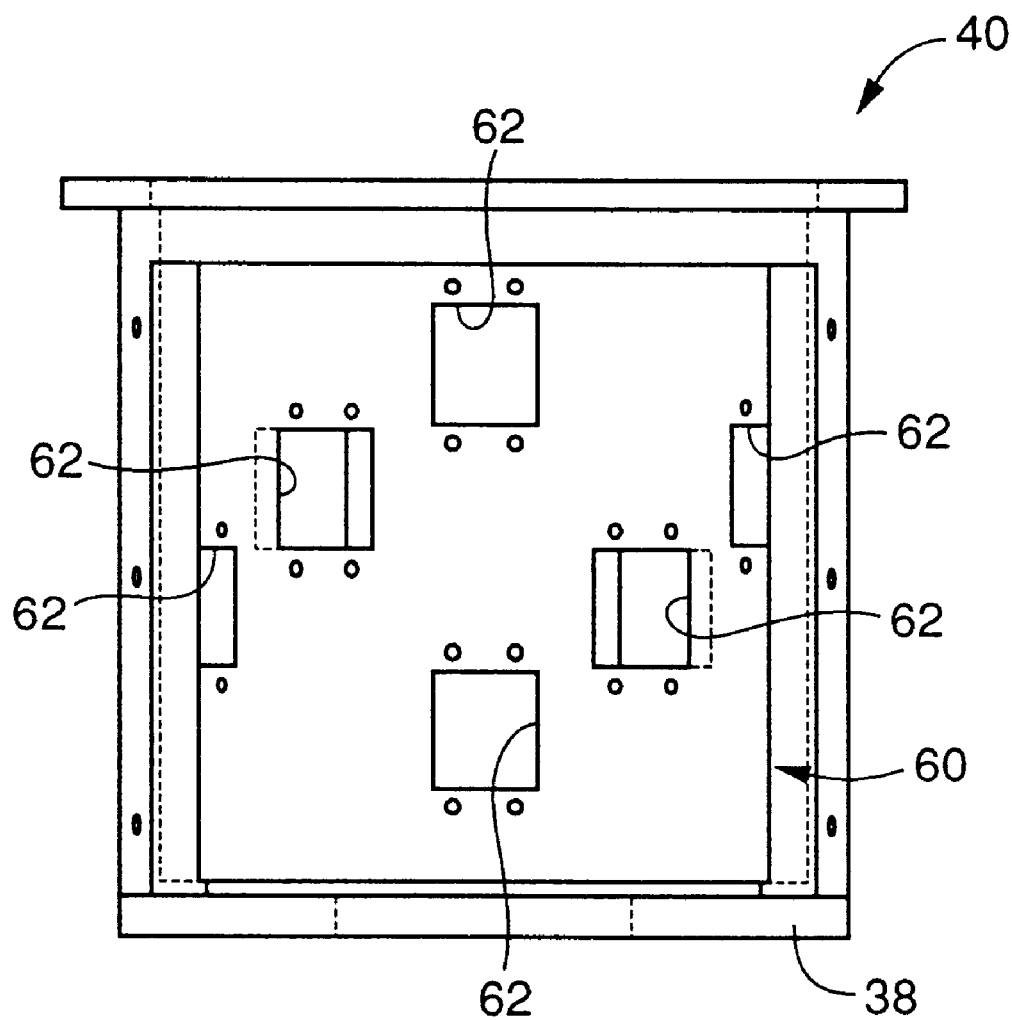
FIG. 6 is a plan view of a housing as part of an outer structure as an element of the chip breaking apparatus of FIG. 1.

A portion of the cylindrical wall of the housing 40 is cut off to form an opening 60 which communicates with an external member or device different from the present chip breaking apparatus. In addition, the cylindrical wall of the housing 40 has a plurality of rectangular through-holes 62 which are arranged along a line which is inclined relative to the axial direction of the chip breaking device 12, as shown in FIG. 6. The through-holes 62 are formed through the thickness of the cylindrical wall of the housing 40. A plurality of breaking blocks 64 as outer breaking blocks are externally fitted in the plurality of through-holes 62, respectively, and each of the breaking blocks 64 is fixed to an outer circumferential surface of the housing 40 with a plurality of bolts. Each of the breaking blocks 64 includes an attachment portion 66 having bolt holes in its four corners, and a projecting portion 68 which projects from the attachment portion 66 and which has a recess 70 extending in a circumferential direction of the cylindrical wall of the housing 40. In a state in which the breaking blocks 64 are attached to the housing 40, respective free end portions of the projecting portions 68 of the breaking blocks 64 project over the inner circumferential surface of the housing 40, into an inside space of the housing 40, so that the respective recesses 70 of the projecting portions 68 open radially inwardly in the inside space and are opposed to the rotary shaft 30.

An inner breaking body 80 is provided in the housing 40. The inner breaking body 80 includes a cylindrical hollow hub portion 82 which is attached to the rotary shaft 30 such that the hub portion 82 is not rotatable relative to the shaft 30 and is not movable relative to the same 30 in the axial direction of the chip breaking device 12. The inner breaking body 80 further includes three arm portions 84 which extend radially outwardly from the hub portion 82 such that the three arm portions 84 are equiangularly distant from one another about the axis line of the rotary shaft 30. As shown in FIG. 3, a free end portion of each of the three arm portions 84 has four projections 86 which project radially outwardly at respective positions which correspond to the respective recesses 70 of the outer breaking blocks 64 and which are distant from one another at a regular interval in the axial direction of the chip breaking device 12. The free end portion of each arm portion 84 has two side surfaces which are opposite to each other in the rotating direction of the rotary shaft 30, and a downstream-side one 88 of the two side surfaces as viewed in the rotating direction has a recess 90 which has a rectangular cross section and which extends in the axial direction of the breaking device 12. Three integral breaking blocks 92 as inner breaking blocks are detachably attached to the respective downstream-side side surfaces 88 of the three arm portions 84. Each of the three inner breaking blocks 92 includes an attachment portion 94 which is fitable in a corresponding one of the three recesses 90, and four projections 96 which project from the attachment portion 94 at respective positions which are distant from one another at a regular interval in the axial direction of the breaking device 12. In the state in which the three inner breaking blocks 92 are fixed to the three radial arm portions 84 with bolts, the four projections 96 of each of the breaking blocks 92 are aligned side by side with the four projections 86 of a corresponding one of the arm portions 84, at the respective axial-direction positions, and project radially outwardly such that the respective free ends of the four projections 96 are located on a common circle on which the four projections 86 are located, or on a circle slightly smaller than that on which the four projections 86 are located. The projections 86, 96 of the inner breaking body 80 are rotated relative to the respective recesses 70 of the outer breaking blocks 64 such that respective gaps which cannot cause the chips to be sheared by the projections 86, 96 and the recesses 70 are left between the projections 86, 96 and the recesses 70. In the present embodiment, the gaps left between the projections 86, 96 and the recesses 70 have the width of 5.0 mm. In addition, the inner breaking blocks 92 are rotated relative to the outer breaking blocks 64 such that respective gaps which cannot cause the chips to be sheared by the inner and outer breaking blocks 92, 64 are left between the inner and outer breaking blocks 92, 64.

Figure 7:
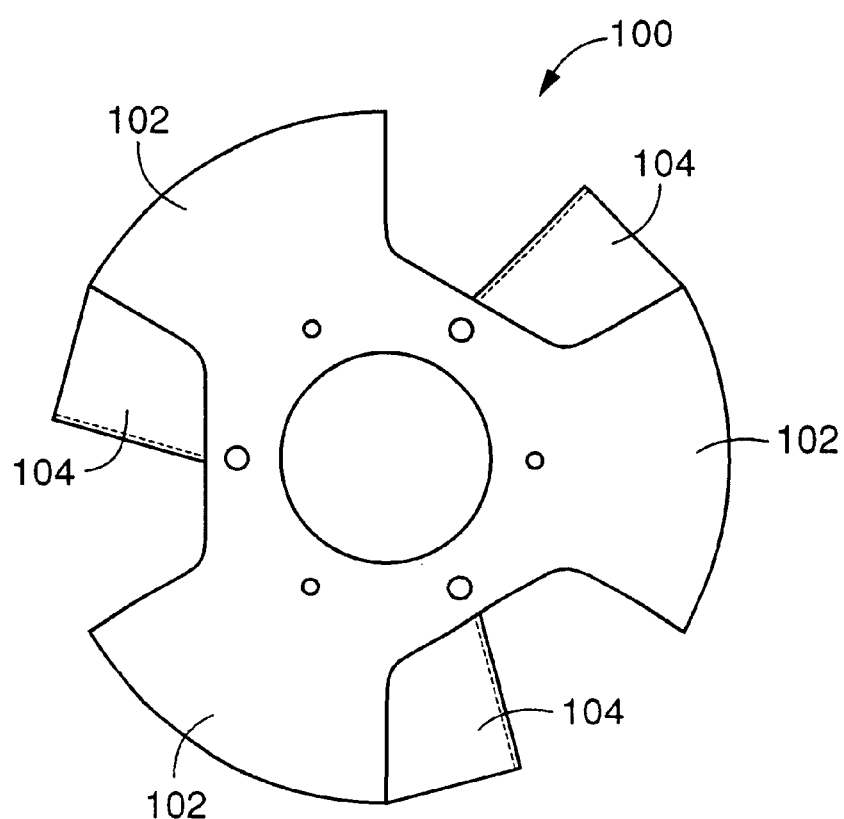
FIG. 7 is a plan view of an air flowing member as an element of the chip breaking apparatus of FIG. 1.
Figure 8:
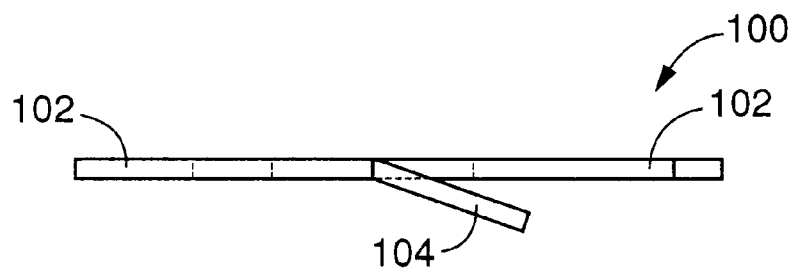
FIG. 8 is a front elevation view of the air flowing member of FIG. 7.

The second-stage breaking device 34 includes, below the inner breaking body 80, an air flowing member 100 which is not rotatable relative to the breaking body 80 and is not movable relative to the same 80 in the axial direction of the chip breaking device 12. As shown in FIGS. 7 and 8, the air flowing member 100 includes a plate-like circular central portion which has a circular central hole, and three blades 102 which are integral with the central portion and which extend radially outwardly from the central portion. Each of the three blades 102 includes two end portions opposite to each other in the rotating direction of the rotary shaft 30, and a downstream-side one of the two opposite end portions of the each blade 102 in the rotating direction of the rotary shaft 30 is inclined in the downward direction. Thus, the air flowing member 100 generates an air flow directed in the upward direction. When the inner breaking body 80 and the air flowing member 100 are fixed to the rotary shaft 30, the relative phase (i.e., relative rotation position) of the two elements 80, 100 in the rotating direction of the rotary shaft 30 is selected such that the inclined end portion 104 of each blade 102 of the air flowing member 100 is aligned with an upstream-side portion of a first space present between the respective free end portions of a corresponding pair of adjacent arm portions 84 of the inner breaking body 80 as seen in the rotating direction of the rotary shaft 30, and such that a second space which is provided between the inclined end portion 104 of the each blade 102 and another blade 102 preceding in the rotating direction of the rotary shaft 30 and which is followed by the inclined end portion 104 when the air flowing member 100 is rotated with the rotary shaft 30 is aligned with a downstream-side portion of the first space in the axial direction of the chip breaking device 12. Therefore, when the air flowing member 100 is rotated with the rotary shaft 30, an air flow is generated in the upward direction in the housing 40. In addition, the chips falling down in the three first spaces among the three arm portions 84 are repelled up by the inclined end portions 104 of the three blades 102 of the air flowing member 100.

Figure 4:
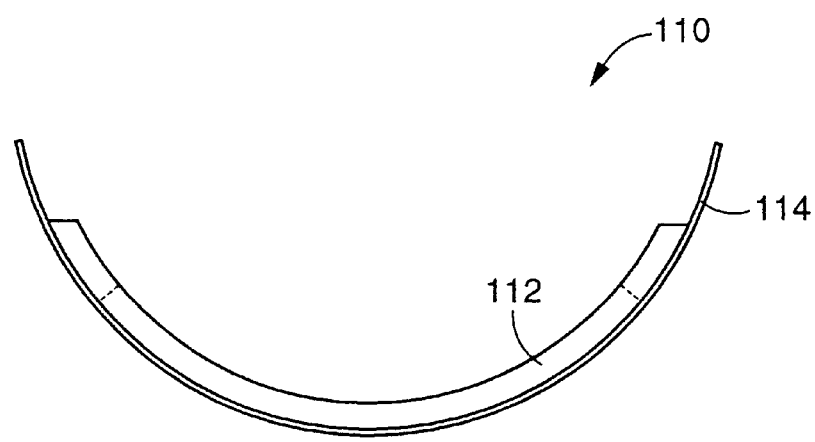
FIG. 4 is a plan view of a sieve plate as an element of the chip breaking apparatus of FIG. 1.
Figure 5:
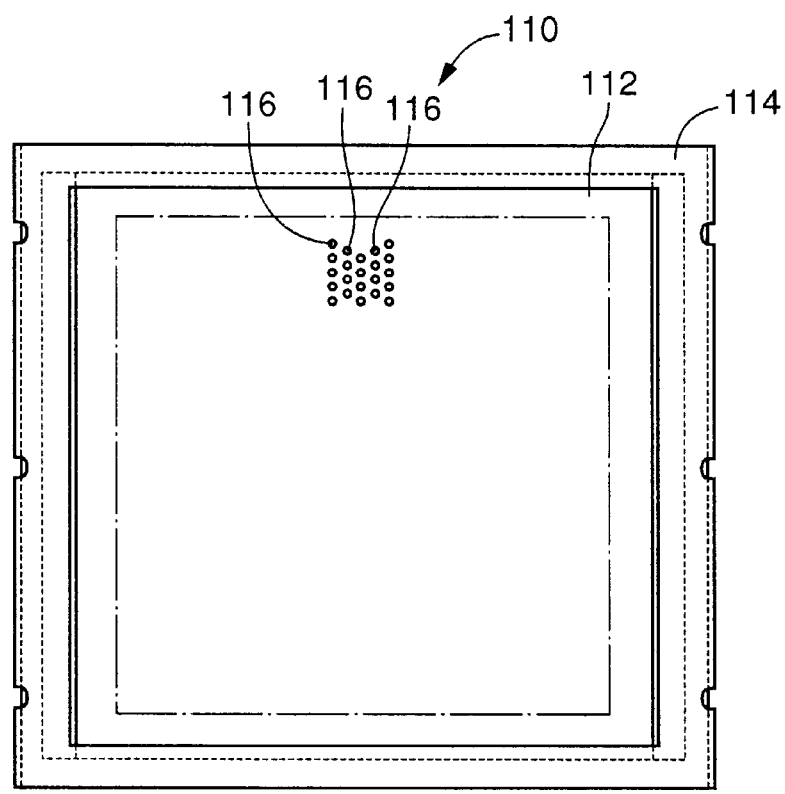
FIG. 5 is a front elevation view of the sieve plate of FIG. 4.

The opening 60 of the housing 40 is covered by a sieve plate 110, which is not shown in FIGS. 2 and 3. As shown in FIGS. 4 and 5, the sieve plate 110 includes a part-cylindrical main portion 112 and a frame portion 114 which is fixed to an outer circumferential surface of the main portion 112 and which has a generally rectangular opening. The main portion 112 has dimensions which allow itself to fit in the opening 60, and the frame portion 114 has dimensions greater than those of the opening 60. The main portion 112 is externally fitted in the opening 60, such that the frame portion 114 is held in close contact with an outer surface of a portion of the housing 40 that defines the opening 60. In this state, U-shaped recesses formed in opposite end portions of the frame portion 114 in a circumferential direction of the sieve plate 110 are engaged with bolts screwed in the housing 40. If the worker fastens the bolts, the sieve plate 110 is fixed to the housing 40. The main portion 112 of the sieve plate 110 has, in a portion thereof corresponding to the opening of the frame portion 114, a number of small holes 116 which are formed through the thickness thereof at a regular interval of distance in each of three directions. In the present embodiment, the holes 116 has a diameter of about 5 mm. The holes 116 are formed by drilling in the sieve plate 110, before the sieve plate 110 is so curved as to have a part-cylindrical shape. Since the sieve plate 110 is thus curved, each hole 116 has a smaller cross-section area on the side of the inner surface of the sieve plate 110, and a greater cross-section area on the side of the outer surface of the same 110. Therefore, each hole 116 is effectively prevented from being clogged with the fragments resulting from the chips. In FIG. 5, only some holes 116 are shown, and the other holes 116 are not shown.

The housing 40 and the sieve plate 110 are covered by a cover member 120 with a space being left therebetween. In FIG. 3, only an outline of the cover member 120 is indicated at two-dot chain line. The cover member 120 includes a fixed portion 122 which is fixed to an upper surface of the base member 16 with bolts, and a fragment receptacle 124 which includes a pivotable upper portion which is pivotable by a predetermined angle relative to the fixed portion 122. The fragment receptacle 124 covers the sieve plate 110 of the second-stage breaking device 34, such that a space is left between the receptacle 124 and the sieve plate 110. The upper portion of the fragment receptacle 124 is pivotable to its operative position where the upper portion covers the sieve plate 110 and to a retracted position, away from the operative position, where the upper portion allows the worker to make access to the sieve plate 110. While the chip breaking device 12 breaks the chips, the upper portion of the fragment receptacle 124 is held at the operative position, by being locked with a locking device 125 shown in FIG. 2. On the other hand, when the breaking device 12 does not break chips, the worker can unlock the locking device 125 and pivot, relative to the fixed portion 122, the upper portion of the receptacle 124 to the retracted position, so that he or she can make access to the sieve plate 110 and the inside space of the receptacle 124 and can check the sieve plate 110 and the receptacle 124.

Figure 9:
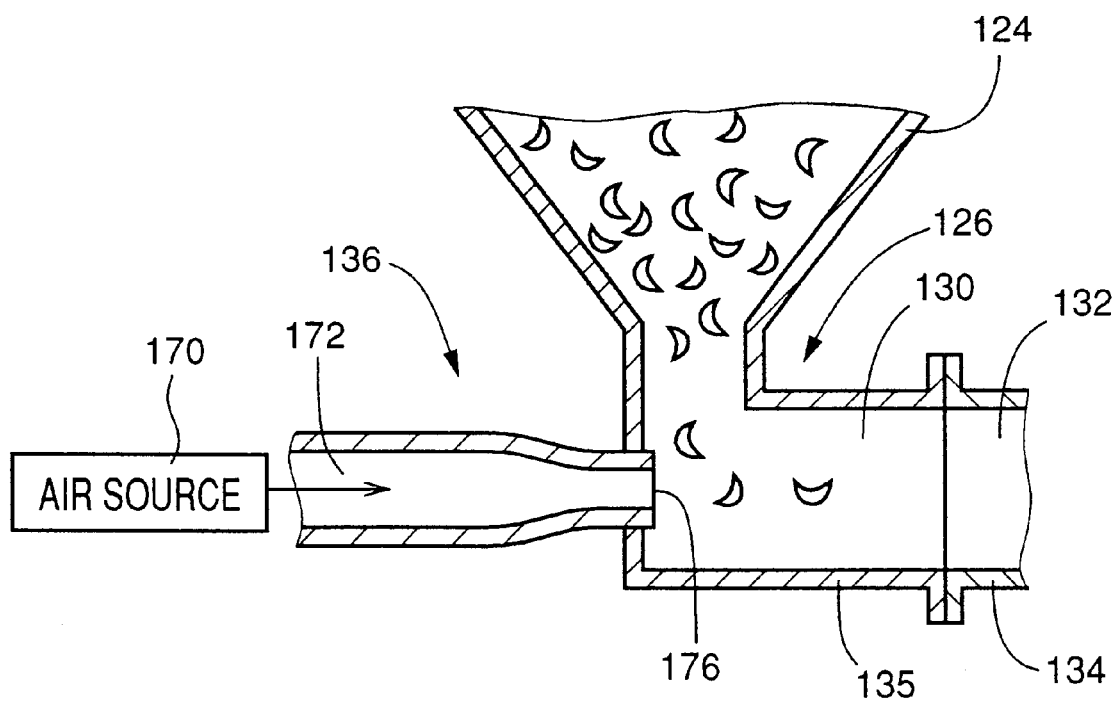
FIG. 9 is a cross-sectioned front elevation view of a fragment conveying device as an element of the chip breaking apparatus of FIG. 1.

The fragment receptacle 124 includes a generally pyramidal lower portion 126 whose transverse-cross-section area decreases in the downward direction. The lower portion 126 of the receptacle 124 is produced, independent of the pivotable upper portion of the same 124 which covers the sieve plate 110, and is fixed to the fixed portion 122. In the state in which the upper portion of the receptacle 124 is kept at the operative position, the lower portion 126 functions as a unit with the upper portion. The lower portion 126 receives and collects the fragments which have been broken from the chips by the first-stage and second-stage breaking devices 32, 34 and have passed through the small holes 116 of the sieve plate 110. The fragments are received by an inclined surface 128 of the pyramidal portion of the lower portion 126, and are moved along the inclined surface 128 in the downward direction because of the gravity exerted thereto. The lower portion 126 has an outlet 130 which is defined by a horizontal connection portion 135 and which is connected to a fragment conveying passage 132 defined by a fragment conveying conduit 134, as shown in FIG. 9. In the state in which the conveying conduit 134 is positioned such that an axis line of the conduit 134 is parallel to a lengthwise direction of the connection portion 135, respective outer flanges formed at respective end portions of the two elements 134, 135 that are opposed to each other are fixed to each other with an appropriate fixing means such as bolts. The other end portion of the connection portion 135 that is opposite to the one end portion thereof connected to the conveying conduit 134 has a rectangular cross section corresponding to that of the lower portion 126 of the fragment receptacle 124. The one end portion of the connection portion 135 has a circular cross section which internally contacts the rectangle of the cross section of the other end portion of the same 135 and whose diameter is substantially equal to that of the conveying conduit 134. Therefore, the cross section of the outlet 130 defined by the connection portion 135 decreases in a direction toward the conveying passage 132. More specifically described, the respective areas of the four corners of the rectangular cross section of the other end portion of the connection portion 135 (or outlet 130) decrease in the above-indicated direction, and the connection portion 135 (or outlet 130) has the circular cross section at the one end portion thereof connected to the conveying conduit 134 (or passage 132). The fragment conveying conduit 134 is connected to an air-flow generating device 136, shown in FIG. 9, which utilizes a pressurized air. The fragment conveying conduit 134 and the air-flow generating device 136 cooperate with each other to provide a main portion of a fragment conveying device which conveys, by utilizing the air flow, the fragments collected in the lower portion 126 of the fragment receptacle 124, to outside the present chip breaking apparatus. The fragment conveying device including the air-flow generating device 136 will be described in detail later.

The present chip breaking apparatus constructed as described above breaks, into small fragments, chips produced when a machining element of a machine tool machines workpieces or blanks. Elongate noodle-like chips entangled with one another are very difficult to break. However, the present breaking apparatus can break even those chips. When the rotary drive device 14 rotates the rotary shaft 30 at a velocity of from 1,400 to 1,700 rotations per minute, the involve-break member 48, the inner breaking body 80, and the air flowing member 100 are rotated altogether. If, in this state, the noodle-like chips entangled with one another are cast through the inlet 44, those chips are separated into small portions by the cooperation of the gravity exerted thereto and the separating portions 52 being rotated, and then are drawn downward through the spaces present between the four inner separate blades 50. Some of the noodle-like chips entangled with one another are separated by being caught on, and drawn by, the respective leading edges of the inner blades 50. Some of the noodle-like chips and some of the small portions resulting from those chips are broken by being struck by the leading edges of the inner blades 50 or by being bitten by the gaps present between the outer single spiral blade 46 and the inner separate spiral blades 50. The gaps between the outer blade 46 and the inner blades 50 cannot cause chips to be sheared by those blades 46, 50, and the blades 48, 50 cooperate with each other to break chips mainly by tearing. The centrifugal forces exerted to the chip help the inner blades 50 bite the chips. Since the inner blades 50 is inclined such that a lower surface of each blade 50 can be seen from a downstream side of the each blade 50 in the rotating direction of the rotary shaft 30, the each blade 50 has the function of positively drawing some of the small portions resulting from the chips, in the downward direction toward the second-stage breaking device 34. In addition, an air flow generated by the rotation of the inner blades 50 draws the chips toward the second-stage breaking device 34. The chips engaged with a lower surface of the outer spiral blade 46 because of the centrifugal forces exerted thereto are moved downward by the inclination of the lower surface of the spiral blade 46. That is, the inner separate blades 46 and the outer spiral blade 48 help the chips fall down because of the gravity exerted thereto.

The chips roughly broken by the first-stage breaking device 32 are further broken by the second-stage breaking device 34. The chips enter the gaps present between the outer breaking blocks 64 and the breaking blocks 92 of the inner breaking body 80, and are broken into small fragments by the two elements 64, 92. Since the outer breaking blocks 64 have the recesses 70 and the inner breaking blocks 92 have the projections 96, the chips are moved through the gaps which are long in view of the axial-direction length of the second-stage breaking device 34. Thus, the second-stage breaking device 34 can break chips with efficiency. In addition, the second-stage breaking device 34 include two groups of outer breaking blocks 64 each group of which are arranged along a line which is inclined relative to the axial direction of the chip breaking device 12. The outer breaking blocks 64 of each group are equiangularly spaced from one another with respect to the axis line of the rotary shaft 30. The three inner breaking blocks are also equiangularly spaced from one another with respect to the axis line. Therefore, while the inner breaking body 80 is fully rotated one time, the breaking of the chips occurs at a plurality of rotation positions of the breaking body 80. Thus, the present apparatus can break chips at a high efficiency. Since the inner breaking blocks 92 extend in the axial direction of the breaking device 12 and the outer breaking blocks 64 are arranged along the line inclined relative to the axial direction, a number of "small" or "short" breakings of chips occur. Accordingly, the rotary drive device 14 may be one which is of a small size, i.e., exhibits only a considerably low performance, and respective maxima of the noise and vibration produced when chips are broken may be reduced.

The gaps between the inner breaking blocks 92 and the outer breaking blocks 64 have a width or dimension which cannot cause chips to be sheared by those breaking blocks 92, 64. Therefore, the present apparatus provides fragments with less sharp burrs. The chips are broken by being bent and/or torn by the cooperation of the outer and inner breaking blocks 64, 92, and then are rounded by being bitten and ground in the gaps between those blocks 64, 92. In the second-stage breaking device 34, the chips falls downward because of their weights, but are blown upward by the air flow generated by the air flowing member 100. The chips colliding with the air flowing member 100 are repelled up by the inclined end portions 104 of the flowing member 100. Thus, the chips are repetitively subjected to the breaking and grinding actions of the breaking blocks 64, 92. In the housing 40, fast and slow air flows occur in different places. The chips are moved in various directions in the housing 40 because the centrifugal forces are exerted to the chips when the chips are rotated with the inner breaking body 80, the gravity is exerted to the chips, and the air flows are caused in the housing 40. During those movements, the chips collide with the inner breaking body 80, the housing 40, and the outer breaking blocks 64, and collide with one another, so that they are rounded. For the above-explained reasons, the present apparatus can break chips into small fragments with less sharp burrs. In the present embodiment, the second-stage breaking device 34 flows air such that the air moves slow on the side of the sieve plate 110, and fast on the side opposite to the sieve plate 110, and such that the air moves around along a generally elliptic locus. The chips are moved around with this air flow. The fragments whose sizes are smaller than the diameter (i.e., 5 mm) of the small holes 116 of the sieve plate 110 can pass through the holes 116, and thus output from the opening 60. Then, the fragments move downward along the inclined surface 128 of the fragment receptacle 124, and accumulate in the lower portion 126 of the receptacle 124. The fragments collected in the lower portion 126 are conveyed out through the outlet 130 by an air flow generated in the conveying passage 132 connected to the air-flow generating device 136.

As is apparent from the foregoing description of the present embodiment, the two housings 36, 40 cooperate with each other to provide a cylindrical portion; the spiral blade 46 provides an outer spiral blade portion; the breaking blocks 64 cooperate with one another to provide an outer breaking portion; and the cylindrical portion, the outer spiral blade portion, and the outer breaking portion cooperate with one another to provide an outer structure. The rotary shaft 30 and the hub portions 49, 82 cooperate with each other to provide a central portion; the separate blades 50 cooperate with each other to provide an inner spiral blade portion; the inner breaking body 80 provides an inner breaking portion; and the central portion, the inner spiral blade portion, and the inner breaking portion cooperate with one another to provide an inner structure which is rotated relative to the outer structure by the rotary drive device 14.

Hereinafter, the above-mentioned fragment conveying device will be described in detail by reference to FIG. 9. The present fragment conveying device and the above-described chip breaking device cooperate with each other to provide a chip treating system to which the present invention is also applied.

As schematically illustrated in FIG. 9, the air-flow generating device 136 includes an air source 170 which supplies a pressurized air, and an air blowing nozzle 172 which is connected at one end thereof to the air source 170. The air blowing nozzle 172 is connected at the other end thereof to the connection portion 135 of the lower portion 126 of the fragment receptacle 124, such that the nozzle 172 is opposite to the fragment conveying conduit 134 and such that an axial direction of the nozzle 172 is parallel to a lengthwise direction of the conduit 134. Thus, the nozzle 172 blows, through an outlet 176 thereof, the pressurized air into the outlet 130 of the receptacle 124. The chip fragments (i.e., the fragments resulting from the chips) that are collected in the lower portion 126 of the fragment receptacle 124 are sucked with the air therearound toward the outlet 130 because the air flow supplied from the air source 170 in a direction indicated at arrow lowers the air pressure in a portion of the lower portion 126 that communicates with the outlet 130. Thus, the chip fragments are sent into the fragment conveying conduit 134. In the conduit 134, the fragments are conveyed by the air flow generated by the blowing of the pressurized air from the air blowing nozzle 172 or the air source 170.

In the present embodiment, even elongate noodle-like chips entangled with one another can be separated or broken by the first-stage breaking device 32 to a certain size which allows the separated or broken chips to be further broken by the second-stage breaking device 34. The second-stage breaking device 34 further breaks the chips to smaller sizes. Only fragments having small sizes corresponding to the diameter of the holes 116 of the sieve plate 110 can pass through the sieve plate 110 and can accumulate in the fragment receptacle 124. In addition, the sharp burrs of the fragments are rounded by the second-stage breaking device 34, and the rounded fragments are easily treated, e.g., conveyed. Fragments with no or little sharp burrs does not damage the inner surface of the fragment conveying conduit 134, when they are conveyed by the air flow in the conduit 134. Moreover, since the fragments have a substantially constant small size, they can be conveyed with a considerably small amount of air. The present chip breaking apparatus has another advantage that the involve-break member 48, the inner breaking body 80, and the air flowing member 100 are rotated as a unit by the common rotary drive device 14, that is, the present apparatus enjoys a simple overall construction. Furthermore, since the outer breaking blocks 64 and the inner breaking blocks 92 are detachably attached, only one or more wore or damaged blocks 64, 92 can be replaced with one or more new or repaired blocks 64, 92, so that the chip breaking apparatus can be used again easily and quickly.

In the illustrated embodiment, the involve-break member 48, the inner breaking body 80, and the air flowing member 100 are rotated as a unit on one hand, and there is a need to rotate the air flowing member 100 at a considerably high velocity or speed on the other hand. Therefore, the involve-break member 48 and the inner breaking body 80 are rotated at the same high velocity. However, it is possible that at least one of the three members 48, 80, 100 be rotated at a velocity different from that at which the other member or members is or are rotated. For example, it is possible to rotate the air flowing member at a velocity higher than that at which the other two members 48, 80 are rotated, or to rotate the inner breaking body 80 at a velocity smaller than that at which the other two members 48, 100 are rotated. In the case where the involve-break member 48 and/or the inner breaking body 80 are or is rotated at a considerably low velocity, the chips are less affected by centrifugal forces and accordingly are not held by the inner surface of the outer structure 36, 40, 46, 64.

Therefore, the outer structure can be rotated relative to the inner structure 30, 49, 82, 50, 80. In the case where the outer structure is rotated relative to the inner structure, it is possible to rotate the respective housings 36, 40 of the first-stage and second-stage breaking devices 32, 34 at different velocities, or rotate only one of the two housings 36, 40.

It is not essentially required that the present chip breaking apparatus employ both the first-stage and second-stage breaking devices 32, 34. For example, the present apparatus may be modified to include only one of the first-stage and second-stage breaking devices 32, 34, or to include one of the two breaking devices 32, 34 and a different braking device having a different structure.

In the illustrated embodiment, the air flow to convey the chip fragments is generated by blowing air into the fragment conveying passage 132. However, it is possible to generate an air flow by sucking air in the passage 132. For example, the chip breaking apparatus shown in FIGS. 1 to 9 may be used with an air suction device 137, shown in FIG. 10, which includes a vacuum pump 138 and a pump motor (not shown) which drives the vacuum pump 138. Between the fragment conveying conduit 134 and the air suction device 137, there are provided a separating device 140 and a filter device 144. The separating device 140 is provided by a cyclone separator, and has a main body 150 including an upper cylindrical portion and a lower conical portion whose diameter decreases in a direction toward the bottom. The cylindrical portion of the main body 150 has an inlet at an eccentric position, and the fragment conveying conduit 134 is connected to the inlet such that the conduit 134 extends parallel to a tangential line with respect to the cylindrical portion. The main body 150 has an outlet at the center of the top wall thereof, and the outlet is connected to the filter device 144 via a pipe 156. Therefore, in the main body 150, there is always an air flow which is swirled along an inner circumferential surface of the body 150 and then is moved upward along a center line of the body 150. Because of gravity and centrifugal forces, the fragments fall downward while swirling along the inner circumferential surface of the main body 150. Thus, the fragments are separated from the air, and are introduced into a fragment collecting container 160 via a passage connected to the bottom of the main body 150.

The filter device 144 is provided between the separating device 140 and the air suction device 137. The filter device 144 includes an upper inner space which is connected to the separating device 140 via the pipe 156, and a lower inner space which is connected to the air suction device 137 via a pipe 162. The filter device 144 includes a filter member 164 which divides an inner space of the filter device 144 into the upper and lower inner spaces. The filter device 164 separates foreign matters from the air sucked by the air suction device 137. Two pressure sensors 166, 168 are provided in the two pipes 156, 162. A pressure-difference detecting device including the two sensors 166, 168 detects a pressure difference between an upstream-side passage and a downstream-side passage with respect to the filter device 144. If the pressure difference detected by the detecting device is more than a reference pressure difference, a computer (not shown) judges that the small holes of the filter member 164 are clogged with foreign matters, and informs a worker of that situation by operating a display to indicate a message, operating a buzzer to generate a sound, and/or operating a lamp to blink.

FIG. 11 shows a chip treating system which includes a plurality of chip breaking apparatuses each of which is shown in FIGS. 1 to 9, and a fragment conveying and collecting device. The plurality of chip breaking apparatuses are provided for a plurality of machine tools, respectively. It is assumed that each of the chip breaking apparatuses includes a fragment conveying device which is identical with the fragment conveying device shown in FIG. 9, that is, includes an air supplying device and an air blowing nozzle 172 for blowing a pressurized air and thereby generating an air flow. Therefore, the same reference numerals as used in FIG. 9 are used to designate the corresponding elements of the present system shown in FIG. 11, and the description thereof is omitted. FIG. 11 shows two chip breaking apparatuses out of all the chip breaking apparatuses, more specifically, indicates, at two-dot chain lines, only respective outlines of respective lower portions 126 of respective fragment receptacles 134 of those two breaking apparatuses. Respective downstream-side ends of respective fragment conveying conduits 134 of the two breaking apparatuses are connected to a main fragment conveying conduit 180 whose diameter is greater than that of the branch conduits 134, such that the respective lengthwise directions of the branch conduits 134 are inclined by a small angle with respect to a lengthwise direction of the main conduit 180. Thus, the direction of flowing of the air from each branch conduit 134 into the main conduit 180 is substantially parallel to that of flowing of the air in the main conduit 180, so that the air flow from the each branch conduit 134 into the main conduit 180 does not obstruct the air flow in the main conduit 180.

In the present chip treating system, the chip fragments produced by the chip breaking apparatuses are sent from the branch conduits 134 into the main conduit 180 by the air blown from the air blowing nozzles 172, and then are conveyed by the air f low in the main conduit 180 and collected to a common place.

Figure 10:
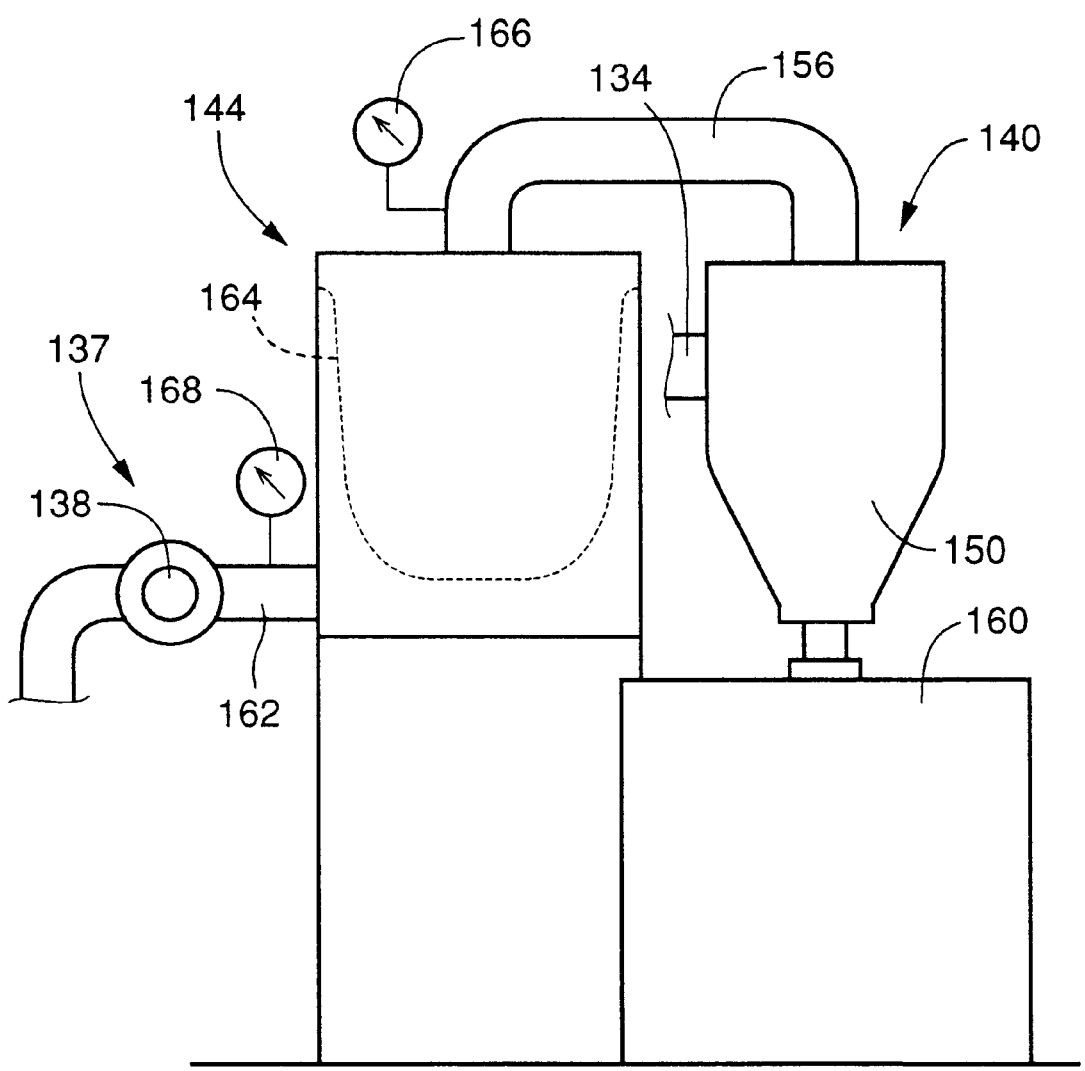
FIG. 10 is a front elevation view of a fragment conveying device as an element of another chip breaking apparatus as a second embodiment of the present invention.

However, the fragment conveying and collecting device may be used with a plurality of chip breaking apparatuses each of which generates an air f low by sucking air in a fragment conveying passage 134 in a manner shown in FIG. 10. In this case, chip fragments are conveyed by the suction air, and are collected at a common place.

It is to be understood that the present invention may be embodied with other changes, improvements, and modifications that may occur to the person skilled in the art without departing from the scope and spirit of the invention defined in the appended claims.

What is claimed is:

1. An apparatus for breaking metallic chips produced by cutting metallic workpieces, with a machine tool, into fragments, comprising:
    an outer structure;
    an inner structure which is provided inside the outer structure such that the inner structure is concentric with the outer structure;
    a rotary drive device which rotates, in a rotating direction, at least one of the inner and outers structures relative to the other of the inner and outer structures, about a common centerline of the inner and outer structures;
    then outer structure including a cylindrical portion, and an outer breaking portion which projects from an inner circumferential surface of the cylindrical portion; and
    the inner structure including an inner breaking portion which cooperates with the outer breaking portion to define a gap therebetween whose width cannot cause the chips to be sheared by the inner and outer breaking portions,
        wherein at least one of the outer breaking portion and the inner breaking portion comprises a plurality of breaking blocks each one of which is detachably attachable independent of the other breaking block or blocks,
        wherein the plurality of breaking blocks are provided along a line which inclined relative to a reference direction parallel to said common centerline, and
        wherein the outer breaking portion comprises the plurality of breaking blocks, and the cylindrical portion of the outer structure has a plurality of through-holes which are formed through a thickness of the cylindrical portion, and wherein the breaking blocks are externally fitted in the through-holes, respectively, and thereby fixed to an outer circumferential surface of the cylindrical portion.

2. An apparatus for breaking metallic chips produced by cutting metallic workpieces, with a machine tool, into fragments, comprising:
    an outer structure;
    an inner structure which is provided inside the outer structure such that the inner structure is concentric with the outer structure;
    a rotary drive device which rotates, in a rotating direction, at least one of the inner and outer structures relative to the other of the inner and outer structures, about a common centerline of the inner and outer structures;
    the outer structure including a cylindrical portion, and an outer breaking portion which projects from an inner circumferential surface of the cylindrical portion; and
    the inner structure including an inner breaking portion which cooperates with the outer breaking portion to define a gap therebetween whose width cannot cause the chips to be sheared by the inner and outer breaking portions,
        wherein the outer structure further includes an outer spiral blade portion which spirally projects from an upper portion of the inner circumferential surface of the cylindrical portion, and the outer breaking portion of the outer structure projects from a lower portion of the inner surface of the cylindrical portion, wherein the inner structure further includes a central portion which is concentric with the cylindrical portion of the outer structure, and an inner spiral blade portion which extends radially from an outer circumferential surface of the central portion to a position in vicinity of the outer spiral blade portion, the inner spiral blade portion cooperates with the outer spiral blade portion to break the chips, and the inner breaking portion projects radially from the central portion below the inner spiral blade portion, and wherein the outer and inner spiral blade portions cooperate with each other to provide a first-stage breaking device which breaks a plurality of elongate chips which are entangled in each other, while untangling the entangled elongate chips, and the outer and inner breaking portions cooperate with each other to provide a second-stage breaking device which further breaks the chips broken by the first-stage breaking device, into the fragments.

3. An apparatus according to claim 2, wherein at least one of the outer breaking portion and the inner breaking portion is provided along a line which is inclined relative to a reference direction parallel to said common centerline.

4. An apparatus according to claim 2, wherein at least one of the outer breaking portion and the inner breaking portion has a recess, and the other of the outer and inner breaking portions has a projection which is fitted in the recess such that said gap is left between the projection and the recess.

5. An apparatus according to claim 2, wherein at least one of the outer breaking portion and the inner breaking portion comprises a plurality of breaking blocks each one of which is detachably attachable independent of the other breaking block or blocks.

6. An apparatus according to claim 5, wherein the plurality of breaking blocks are provided along a line which is inclined relative to a reference direction parallel to said common centerline.

7. An apparatus according to claim 3, wherein the other of the outer breaking portion and the inner breaking portion is provided along a line which is parallel to a reference direction parallel to said common centerline.

8. An apparatus according to claim 7, wherein the other of the outer breaking portion and the inner breaking portion comprises an integral breaking block extending in the reference direction.

9. An apparatus according to claim 2, wherein the inner structure includes a central portion and a plurality of radial arms which extend radially outwardly from the central portion and each of which has a free end portion providing the inner breaking portion.

10. An apparatus according to claim 2, wherein the cylindrical portion of the outer structure has an opening which is formed through a thickness of the cylindrical portion, and wherein the apparatus further comprises a sieve plate which has a number of holes and which covers the opening of the cylindrical portion.

11. An apparatus according to claim 10, further comprising a fragment receptacle which is provided outside the sieve plate, which receives the fragments which have passed through the sieve plate, and which collects the received fragments in a lower portion thereof.

12. An apparatus according to claim 11, further comprising a fragment conveying device which conveys, by utilizing an air flow, the fragments collected in the lower portion of the fragment receptacle to outside the apparatus.

13. An apparatus according to claim 11, wherein at least a portion of the fragment receptacle is displaceable between an operative position where said portion of the receptacle externally covers the sieve plate with a space being left therebetween, and a retracted position, away from the operative position, where said portion of the receptacle permits access to the sieve plate.

14. An apparatus according to claim 13, wherein said portion of the fragment receptacle is pivotable between the operative position and the retracted position.

15. An apparatus according to claim 2, wherein said common centerline is substantially vertical.

16. An apparatus according to claim 2, wherein said common centerline is parallel to a reference direction having a vertical component, and wherein the apparatus further comprises a plurality of air flowing blades which are provided adjacent to a lower end portion of the inner structure such that the plurality of air flowing blades are concentric with the inner structure and which are rotated about said common centerline to generate an air flow directed toward the inner structure.

17. An apparatus for breaking metallic chips produced by cutting metallic workpieces, with a machine tool, into fragments, comprising:

an outer structure;

an inner structure which is provided inside the outer structure such that the inner structure is concentric with the outer structure;

a rotary drive device which rotates, in a rotating direction, at least one of the inner and outer structures relative to the other of the inner and outer structures, about a common centerline of the inner and outer structures;

the outer structure including a cylindrical portion, and an outer breaking portion which projects from an inner circumferential surface of the cylindrical portion; and the inner structure including an inner breaking portion which cooperates with the outer breaking portion to define a gap therebetween whose width cannot cause the chips to be sheared by the inner and outer breaking portions, wherein the rotary drive device rotates, in the rotating direction, the inner structure relative to the outer structure about a substantially vertical centerline thereof as the common centerline of the inner and outer structures, wherein the outer structure further includes an outer spiral blade portion which spirally projects from an upper portion of the inner circumferential surface of the cylindrical portion, and the outer breaking portion of the outer structure projects from a lower portion of the inner surface of the cylindrical portion, wherein the inner structure further includes a central portion which is concentric with the cylindrical portion of the outer structure, and an inner spiral blade portion which extends radially from an outer circumferential surface of the central portion to a position in vicinity of the outer spiral blade portion, and which is inclined relative to the rotating direction such that at least one of a direction in, and an angle by, which the inner spiral blade portion is inclined differs from a corresponding one of a direction in, and an angle by, which the outer spiral blade portion is inclined, the inner spiral blade portion cooperating with the outer spiral blade portion to break the chips, the inner breaking portion projecting radially from the central portion below the inner spiral blade portion, and wherein at least one of the outer breaking portion and the inner breaking portion is provided along a line which is inclined relative to a reference direction parallel to said substantially vertical centerline.

18. An apparatus for breaking metallic chips produced by cutting metallic workpieces, with a machine tool, into fragments, comprising:

an outer structure;

an inner structure which is provided inside the outer structure such that the inner structure is concentric with the outer structure;

a rotary drive which rotates, in a rotating direction, at least one of the inner and outers structures relative to the other of the inner and outer structures, about a common centerline of the inner and outer structures;

the outer structure including a cylindrical portion, and an outer breaking portion which projects from an inner circumferential surface of the cylindrical portion; and the inner structure including an inner breaking portion which cooperates with the outer breaking portion to define a gap therebetween whose width cannot cause the chips to be sheared by the inner and outer breaking portions, wherein the outer braking portion of the outer structure comprises an outer spiral blade portion which spirally projects from the inner circumferential surface of the cylindrical portion thereof, and wherein the inner braking portion of the inner structure comprises a central portion which is concentric with the cylindrical portion of the outer structure, and an inner spiral blade portion which extends radially from an outer circumferential surface of the central portion to a position in vicinity of the outer spiral blade portion, and which is inclined relative to the rotating direction such that at least one of a direction in, and an angle by, which the inner spiral blade portion is inclined differs from a corresponding one of a direction in, and an angle by, which the outer spiral blade portion is inclined.

19. An apparatus according to claim 18, wherein the rotary drive device rotates said at least one of the inner and outer structures relative to said other of the inner and outer structures, at a velocity not less than 800 rotations per minute.

20. An apparatus according to claim 18, wherein the inner braking portion of the inner structure comprises a plurality of blades which extend radially outwardly from the outer circumferential surface of the central portion and each of which is inclined relative to the rotating direction such that a lower surface of said each blade can be seen as viewed from a downstream side of said each blade in the rotating direction.

21. An apparatus according to claim 18, wherein the common centerline of the inner and outer structures is parallel to a first direction having a vertical component, and wherein the inner braking portion of the inner structure comprises a plurality of blades which extend radially outwardly from the outer circumferential surface of the central portion, and a plurality of separating portions which extend from the plurality of blades, respectively, in a second direction having a vertically upward component.

22. A chip treating system for treating metallic chips produced by cutting metallic pieces, with a machine tool, the system comprising:
    a chip breaking apparatus for breaking the chips into fragments, the apparatus including:
    an outer structure,
        an inner structure which is provided inside the outer structure such that the inner structure is concentric with the outer structure, and
        a rotary drive device which rotates, in a rotating direction, at least one of the inner and outer structures relative to the other of the inner and outer structures, about a common centerline of the inner and outer structures,
    the outer structure including a cylindrical portion, and an outer breaking portion which projects from an inner circumferential surface of the cylindrical portion, and the inner structure including an inner breaking portion which cooperates with the outer breaking portion to define a gap therebetween whose width cannot cause the chips to be sheared by the inner and outer breaking portions; and
    a fragment conveying device which conveys, by utilizing an air flow, the fragments output from the chip breaking apparatus,
        wherein the chip breaking apparatus has an outlet through which the fragments are discharged, and the fragment conveying device has fragment conveying passage whose one end is connected to the outlet, and an air-flow generating device which generates, in the fragment conveying passage, said air flow in a direction away from the outlet, and
    wherein the air-flow generating device comprises a pressurized-air-utilizing air-flow generating device which includes an air blowing nozzle which is provided at said one end portion of the fragment conveying passage that is connected to the outlet of the chip breaking apparatus, such that an axial direction of the nozzle is parallel to a lengthwise direction of the passage; and a pressurized-air supplying device which supplies a pressurized air to the air blowing nozzle, so that the pressurized air is blown from the nozzle into the passage, an air pressure around the nozzle is lowered, and accordingly said air flow is generated in a direction from the outlet toward the passage, and in said direction away from the outlet in the passage.

23. A system according to claim 22, wherein the air-flow generating device comprises an air suction device which generates said air flow by sucking air in a downstream-side portion of the fragment conveying passage that is distant from the outlet of the chip breaking apparatus.

* * * * *